United States Patent
Hsu

(10) Patent No.: US 12,472,768 B2
(45) Date of Patent: Nov. 18, 2025

(54) OMNI-DIRECTION WHEEL SYSTEM AND METHODS FOR CONTROLLING THE OMNI-DIRECTION WHEEL SYSTEM

(71) Applicant: Honda Motor Co., Ltd., Minato-ku (JP)

(72) Inventor: Ricky Jukuei Hsu, Rancho Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 1053 days.

(21) Appl. No.: 17/453,125

(22) Filed: Nov. 1, 2021

(65) Prior Publication Data

US 2022/0048316 A1 Feb. 17, 2022
US 2022/0339963 A2 Oct. 27, 2022

Related U.S. Application Data

(63) Continuation of application No. 16/376,981, filed on Apr. 5, 2019, now Pat. No. 11,267,283.

(51) Int. Cl.
*B60B 19/00* (2006.01)
*B60K 7/00* (2006.01)
*B60K 17/30* (2006.01)

(52) U.S. Cl.
CPC .......... *B60B 19/003* (2013.01); *B60B 19/006* (2013.01); *B60B 2900/931* (2013.01); *B60K 7/0007* (2013.01); *B60K 17/30* (2013.01)

(58) Field of Classification Search
CPC .............. B60B 19/003; B60B 19/006; B60B 2900/931; B60B 19/00; B60B 33/0002;
(Continued)

(56) References Cited

U.S. PATENT DOCUMENTS 5,547,038 A 8/1996 Madwed
7,100,722 B2 9/2006 Bowen
(Continued)

FOREIGN PATENT DOCUMENTS

CN 101920730 A 12/2010
CN 102069682 A 5/2011
(Continued)

OTHER PUBLICATIONS

Andrew Moseman, Goodyear Made Spherical MagLev Tires That are Totally Nuts, I'm rolling on spheres, Popular Mechanics, Mar. 3, 2016, (7 Pages Total).
(Continued)

*Primary Examiner* — Valentin Neacsu
*Assistant Examiner* — Marlon A Arce
(74) *Attorney, Agent, or Firm* — ArentFox Schiff LLP

(57) ABSTRACT

The present disclosure generally relates to an omni-direction wheel system and methods for controlling the omni-direction wheel system. The omni-direction wheel system includes a plurality of suspension systems that operate independently of one another. Each suspension system may include an electromagnetic steering hub configured to rotate a wheel 360 degrees about a vertical axis based on a polarity of an electromagnetic signal applied to the electromagnetic steering hub. The suspension system may further include an in-wheel motor configured to rotate with the wheel and drive the wheel about a horizontal axis.

22 Claims, 6 Drawing Sheets

(58) Field of Classification Search
CPC .. B60B 33/0039; B60K 7/0007; B60K 17/30; B60K 2007/0038; B60K 2007/0092; B60K 17/26; B60G 2200/132; B60G 2200/44; B60G 2202/20; B60G 2202/42; B60G 2204/182; B60G 17/0157; B60G 2300/50; B60Y 2200/45

See application file for complete search history.

(56) References Cited

U.S. PATENT DOCUMENTS

| | | | |
|---|---|---|---|
| 7,370,869 | B2 | 5/2008 | Kang |
| 7,730,978 | B2 | 6/2010 | Dixon |
| 7,980,335 | B2 | 7/2011 | Potter |
| 8,430,192 | B2 | 4/2013 | Gillett |
| 8,604,900 | B2 | 12/2013 | Kocijan |
| 8,689,914 | B2 | 4/2014 | Gano et al. |
| 9,004,202 | B2 | 4/2015 | Riwan et al. |
| 9,102,331 | B2* | 8/2015 | Bluethmann .......... B62D 7/026 |
| 9,415,630 | B2* | 8/2016 | Yoshino ................ B62K 11/007 |
| 9,573,416 | B1* | 2/2017 | Niemeyer ............. B60B 19/003 |
| 9,579,927 | B2* | 2/2017 | Parrott .................. B60B 19/003 |
| 9,586,471 | B2* | 3/2017 | Gillett .................... B62K 21/26 |
| 9,630,447 | B2* | 4/2017 | Yoshino ............. B60B 27/0005 |
| 9,656,515 | B2* | 5/2017 | Novoplanski ........... B60B 19/00 |
| 9,821,835 | B2* | 11/2017 | Ferrer-Dalmau Nieto .................. B62D 5/26 |
| 11,124,231 | B2* | 9/2021 | Hiroe .................. B62D 7/1509 |
| 12,059,939 | B2* | 8/2024 | Lee ........................ B60G 3/26 |
| 12,179,862 | B2* | 12/2024 | Sardes ................. B62D 65/024 |
| 2007/0023244 | A1* | 2/2007 | Carlson ................... D06F 37/20 188/267 |
| 2008/0087484 | A1 | 4/2008 | Fenelli et al. |
| 2009/0188729 | A1 | 7/2009 | Berry et al. |
| 2011/0024219 | A1 | 2/2011 | Jorgensen et al. |
| 2012/0043693 | A1* | 2/2012 | King ..................... B29C 33/424 264/219 |
| 2015/0027801 | A1* | 1/2015 | Amino .................... B62D 7/02 180/446 |
| 2015/0123451 | A1 | 5/2015 | Nelson |
| 2015/0130260 | A1* | 5/2015 | Bando .................. B60B 19/003 301/5.23 |
| 2015/0134202 | A1 | 5/2015 | Dawson et al. |
| 2016/0303898 | A1* | 10/2016 | Yoshino ................ B60B 19/003 |
| 2016/0318337 | A1* | 11/2016 | Clerc .................... B62D 61/06 |

FOREIGN PATENT DOCUMENTS

| | | |
|---|---|---|
| CN | 203832155 U | 9/2014 |
| CN | 203840174 U | 9/2014 |
| CN | 104354525 A | 2/2015 |
| CN | 104494721 A | 4/2015 |
| CN | 105966171 A | 9/2016 |
| CN | 205736640 U | 11/2016 |
| CN | 107139646 A | 9/2017 |
| EP | 0426298 A1 | 5/1991 |
| EP | 2589501 A1 | 5/2013 |
| JP | 4003082 B2 | 11/2007 |
| JP | 2016-124348 A | 7/2016 |
| KR | 10-2010-0120324 A | 11/2010 |
| KR | 10-1004957 B1 | 12/2010 |
| KR | 10-1127736 B1 | 3/2012 |
| KR | 10-1378768 B1 | 3/2014 |
| KR | 10-1483366 B1 | 1/2015 |
| KR | 10-1640546 B1 | 7/2016 |
| KR | 10-1725229 B1 | 4/2017 |
| WO | WO 2016/142553 A1 | 9/2016 |
| WO | WO 2017/003000 A1 | 1/2017 |

OTHER PUBLICATIONS

Henry Kamau, Maglev Driveline for Wheeled Vehicles, Create the Future Design, Contest, Jul. 1, 2013, 3 Pages Total.

Trossen Robotics, Motor Mount and Wheel Kit with Position Controller, 11 Pages total, 2017.

* cited by examiner

OMNI-DIRECTION WHEEL SYSTEM AND METHODS FOR CONTROLLING THE OMNI-DIRECTION WHEEL SYSTEM

CROSS-REFERENCE TO RELATED APPLICATION

The present application is a CONTINUATION APPLICATION of U.S. patent application Ser. No. 16/376,981 filed Apr. 5, 2019 and entitled "AN OMNI-DIRECTION WHEEL SYSTEM AND METHODS FOR CONTROLLING THE OMNI-DIRECTION WHEEL SYSTEM," the contents of which are hereby incorporated by reference in their entireties.

TECHNICAL FIELD

The present disclosure generally relates to an omni-direction wheel system and methods for controlling the omni-direction wheel system.

BACKGROUND

Suspension systems can generally be classified into three subgroups: dependent, independent, and semi-dependent. Dependent suspension systems generally may include an axle that holds wheels parallel to each other and perpendicular to the axle. With this configuration, when the camber of one wheel changes, the camber likewise of the opposite wheel likewise changes in the same way. An independent suspension may allow for wheels to rise and fall on their own without affecting the opposite wheel. A semi-dependent suspension is configured such that the motion of one wheel affects the position of the opposite wheel even though the wheels are not rigidly attached to each other.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to an omni-direction wheel system having a plurality of suspension systems that operate independently of one another. Each suspension system may include an electromagnetic steering hub configured to rotate a wheel 360 degrees about a vertical axis based on a polarity of an electromagnetic signal applied to the electromagnetic steering hub. The suspension system may further include an in-wheel motor configured to rotate with the wheel and drive the wheel about a horizontal axis.

In a further aspect, the present disclosure relates to a suspension system. The suspension system may include an electromagnetic steering hub configured to rotate a wheel 360 degrees about a vertical axis based on a polarity of an electromagnetic signal applied to the electromagnetic steering hub. The suspension system may also include an in-wheel motor configured to drive the wheel about a horizontal axis and a smart tire mounted on the wheel and configured to morph into different configurations based on one or more conditions. The smart tire and the in-wheel motor may form a modular unit.

an electromagnetic steering hub configured to rotate a wheel 360 degrees based on a polarity of an electromagnetic signal applied to the electromagnetic steering hub. The suspension system may also include an in-wheel motor and a smart tire configured to morph into different configurations based on one or more conditions. The smart tire and the in-wheel motor may form a modular unit.

In a further aspect, the present disclosure relates to a vehicle having one or more sensors configured to obtain information related to one or more conditions associated with the vehicle or an environment of the vehicle. The vehicle may further include an omni-direction wheel system having a plurality of suspension systems that operate independently of one another. Each suspension system may have an electromagnetic steering hub configured to rotate a wheel 360 degrees based on a polarity of an electromagnetic signal applied to the electromagnetic steering hub. The vehicle may further include a processor configured to process the information obtained from the one or more sensors to control the omni-direction wheel system.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
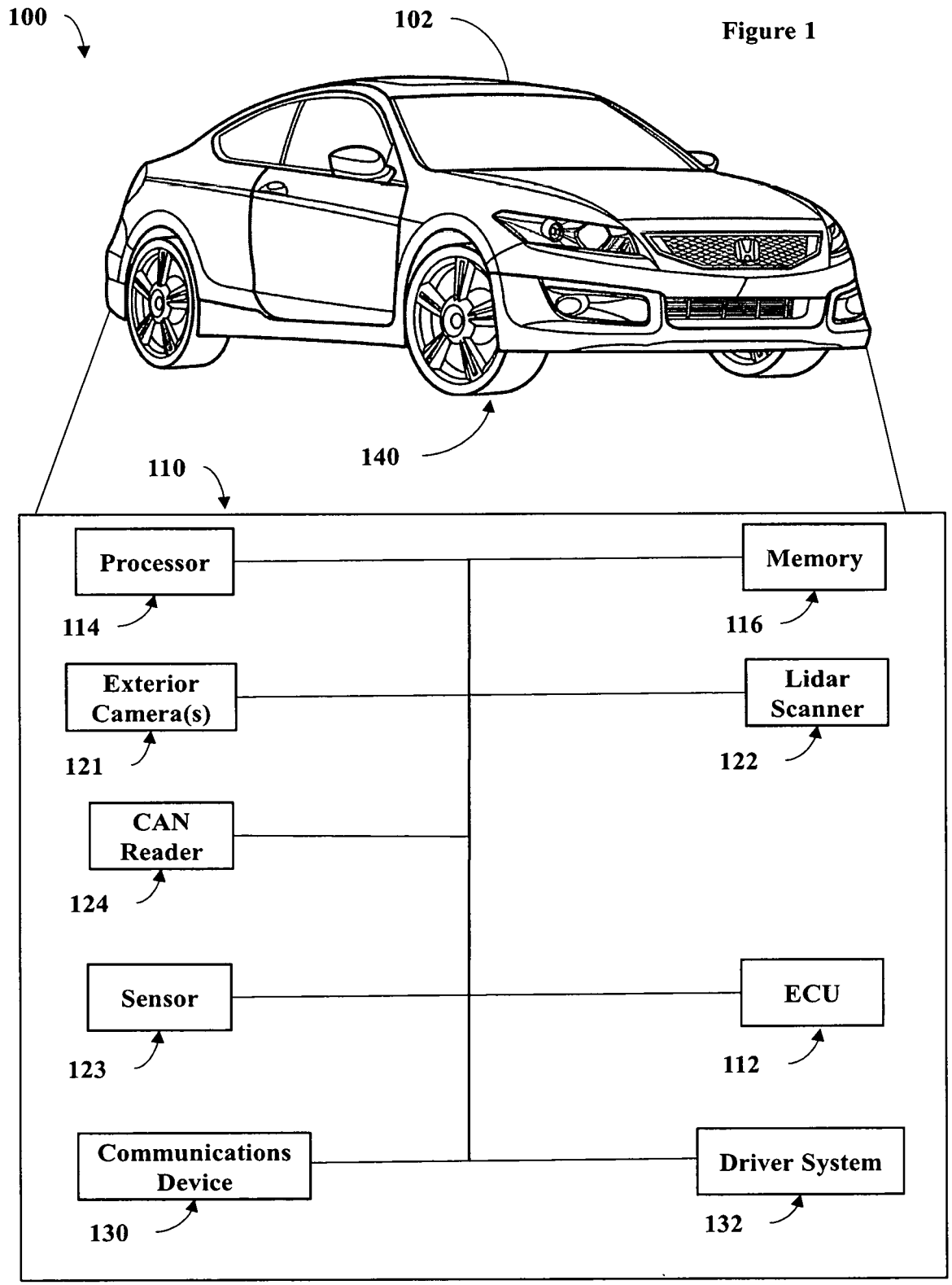
FIG. 1 illustrates a schematic view of an example operating environment of a vehicle system in accordance with aspects of the present disclosure.

Generally described, the present disclosure provides systems and methods for controlling an omni-direction wheel system. Turning to FIG. 1, a schematic view of an example vehicle 102 having a vehicle system 110 and an omni-direction wheel system 140 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, one or more driving systems 132 that may control, for example, the omni-direction wheel system 140. The vehicle system 110 may include a plurality of multi-modal sensors including, but not limited to, one or more exterior cameras 121, a light detection and ranging (Lidar) laser scanner 122, a sensor 123, and a vehicle controller area network (CAN) reader 124. In some aspects, the one or more exterior cameras 121, the Lidar laser scanner 122, and/or the sensor 123 obtain images of and/or information related to the environment surrounding the vehicle 102 and/or detect one or more objects in the environment surrounding the vehicle 102. In further aspects, the CAN reader 124 may obtain data related to operation of the vehicle 102. For example, the CAN reader 124 may obtain vehicle information including, but not limited to, tire pressure, ground pressure of a tire, tire size (e.g., tire width, aspect ratio, diameter), speed, braking, throttle, steering, yaw rate, and velocity, among other information. In some aspects, each of the signals from the plurality of multi-modal sensors may be synchronized to a common system clock.

Figure 5:
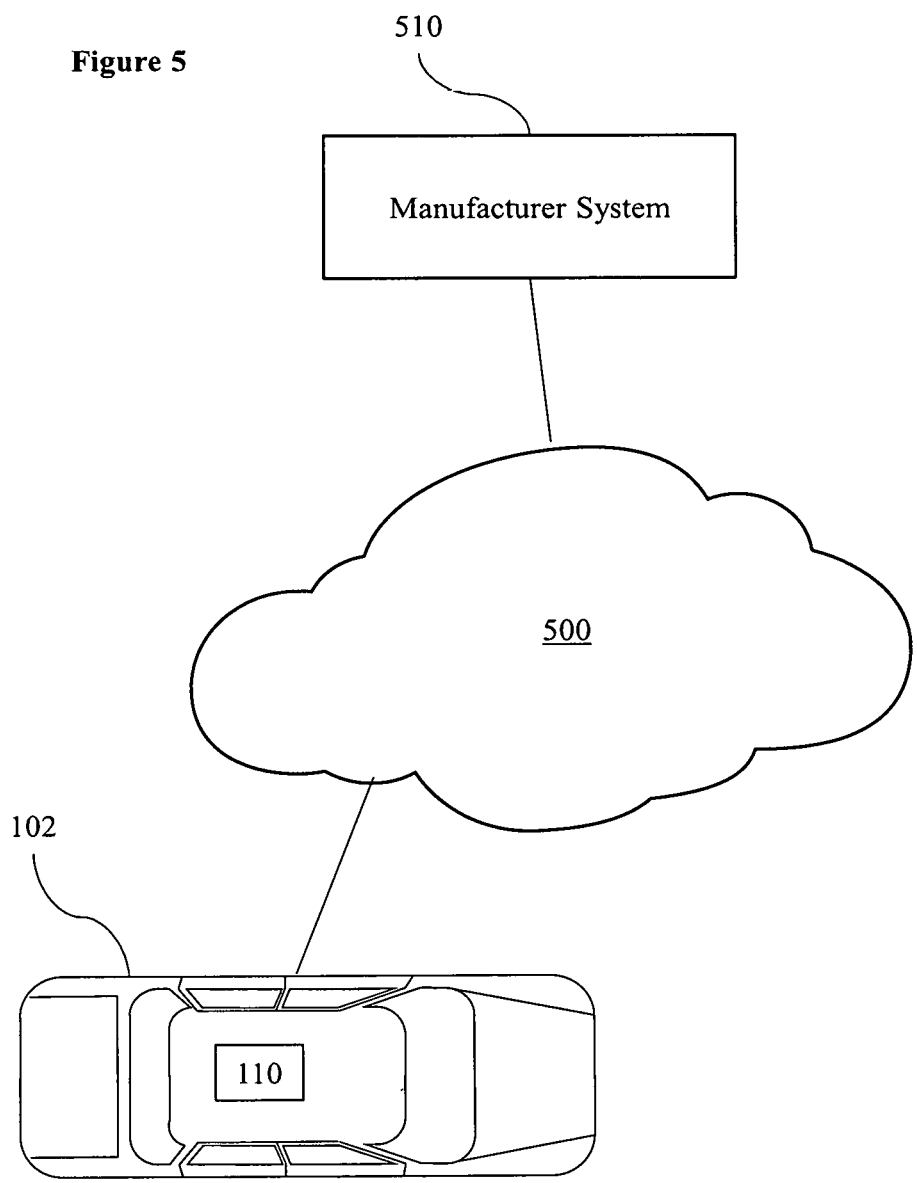
FIG. 5 illustrates an exemplary network for managing the vehicle system in accordance with aspects of the present disclosure.

In some implementations, the information obtained by the one or more exterior cameras 121, the Lidar laser scanner 122, the sensor 123, and/or the CAN reader 124 may be provided to the one or more driving systems 132. For example, the vehicle system 110 may also include a processor 114, a memory 116, and a communications device 130. The communications device 130 (e.g., wireless modem) may provide wired or wireless computer communications utilizing various protocols to send/receive electronic signals internally with respect to features and systems within the vehicle 102 and with respect to external devices. For example, the communications device 130 may wirelessly communicate with a manufacturer system 510, as illustrated in FIG. 5. The manufacturer system 510 and the driving system 132 may include a computer system, as shown with respect to FIG. 6 described below. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems, e.g., the one or more driving systems 132 and the omni-direction wheel system 140. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

Figure 2:
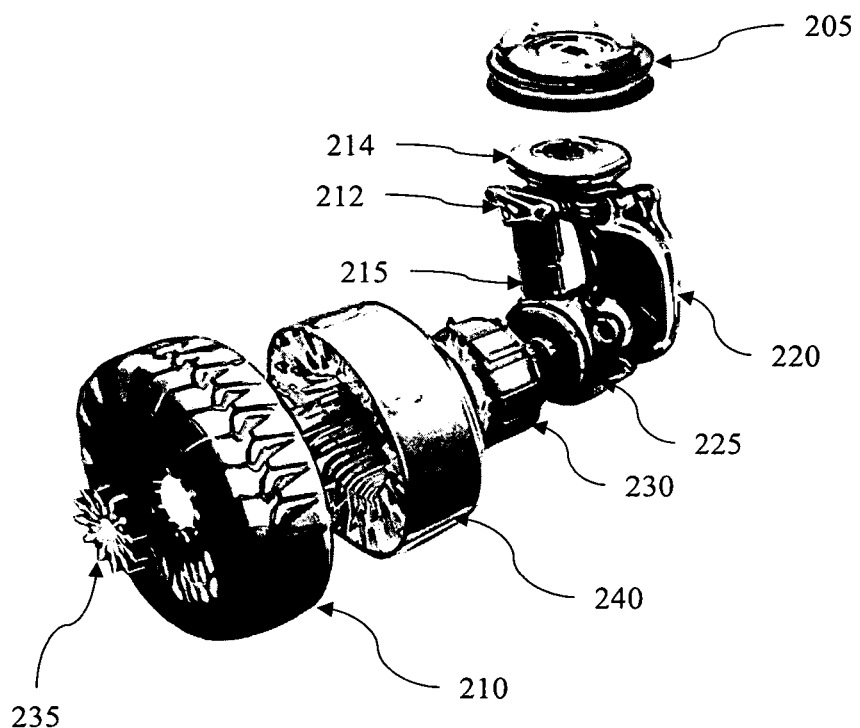
FIG. 2 illustrates a perspective view an example suspension system in accordance with aspects of the present disclosure.
Figure 3:
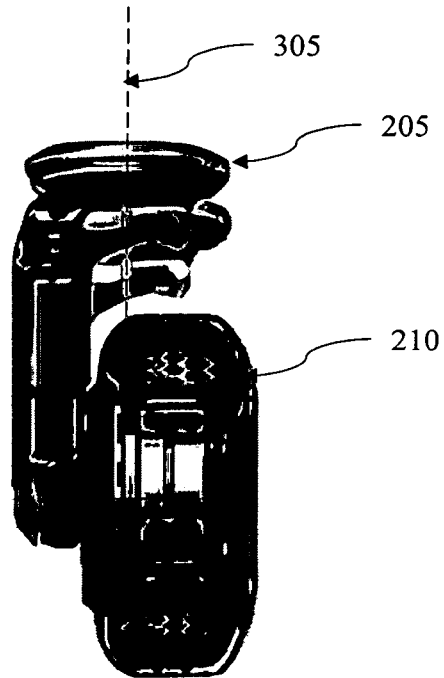
FIG. 3 illustrates a side view of the example suspension system in accordance with aspects of the present disclosure.

In some implementations, the omni-direction wheel system 140 may include a plurality of suspension systems that operate independently of one another. An example suspension system 200 is illustrated in FIG. 2. The example suspension system 200 may include an electromagnetic steering hub 205 configured to enable a smart tire 210 mounted to a wheel 240 to be turned 360 degrees for steering in any direction. For example, as illustrated in FIG. 3, the smart tire 210 may rotate about an axis 305 centered on the electromagnetic steering hub 205. In some implementations, each wheel may be individually rotated in a manner such that the vehicle 102 may move in a direction perpendicular to the vehicle 102, i.e., the vehicle 102 may move laterally. Additionally, each wheel may be individually rotated in a manner such that the vehicle 102 may turn on the spot, i.e., the vehicle 102 may rotate about an axis.

The electromagnetic steering hub 205 may retain a steering disk 214 that is rotationally aligned with the smart tire 210. The electromagnetic steering hub 205 may apply variable electromagnetic forces to rotate the steering disk 214, which in turn rotates the smart tire 210. In some implementations, the smart tire 210 may rotate a full 360 degrees based on a polarity of an electromagnetic signal applied to the electromagnetic steering hub 205. For example, an electromagnetic signal having a first polarity may cause the electromagnetic steering hub 205 to rotate the steering disk 214 in a first direction, whereas an electromagnetic signal having a second polarity opposite to the first polarity may cause the electromagnetic steering hub 205 to rotate the steering disk 214 in a second direction opposite the first direction. In some implementations, the polarity of the electromagnetic signal may be based on a steering input provided by a driver of the vehicle 102. For example, the driver may rotate a steering wheel, or the like, in a given direction, and the vehicle system 110 may provide a signal to the electromagnetic steering hub 205 to generate the electromagnetic signal accordingly. In further implementations, the polarity of the electromagnetic signal may be based on an output provided by an autonomous driving system of the vehicle 102.

Additionally, the suspension system 200 may include a torque arm 212 for controlling a range of motion of the smart tire 210 with respect to the vehicle 102, a magnetic-controlled shock damper 215 for controlling an elevation change of the smart tire 210, a main strut 220 for controlling compression of the suspension system 200, and a rotary damping wheel hub 225 for damping a rotation of the smart tire 210. The suspension system 200 may also include an in-wheel motor 230, such as a stator motor or the like, and a locking hub 235. In some implementations, the smart tire 210 and the in-wheel motor 230 may be modular, such that the combination of the smart tire 210 and the in-wheel motor 230 may be easily replaced and/or upgraded.

The magnetic-controlled shock damper 215 may extend vertically between the steering disk 214 and the rotary damping wheel hub 225. The magnetic-controlled shock damper 215 may be a magnetic linear actuator such as a solenoid, for example. The magnetic-controlled shock damper 215 may exert a downward force on the rotary damping wheel hub 225 based on a control signal provided by the ECU 112. That is, the ECU 112 may control the stiffness of the magnetic-controlled shock damper 215 using the control signal. In an aspect, the control signal may indicate a force greater than a downward force exerted by the vehicle 102 such that the magnetic-controlled shock damper 215 may extend to raise the vehicle 102. In an aspect, the ECU 112 may control the magnetic-controlled shock damper 215 based on information from the one or more exterior cameras 121, the Lidar laser scanner 122, the sensor 123, and/or the CAN reader 124. For example, the ECU 112 may adapt the stiffness of the magnetic-controlled shock damper 215 based on a characteristic of terrain being traversed. In another example, the ECU 112 may control the respective magnetic-controlled shock damper 215 of multiple suspension systems 200 to bring the vehicle 102 toward a level orientation, for example, when the vehicle 102 is on a gradient or transverse angle.

Due to the suspension system 200 being independent of any other suspension system, the vehicle 102 may remain level through various driving conditions, e.g., over uneven terrain, inclement weather conditions, etc. For example, when the vehicle 102 traverses uneven terrain, a height the suspension system 200 may be adjusted based on the terrain being traversed. For example, when the vehicle 102 traverses mountainous terrain, the suspension system 200 may traverse objects of varying heights, e.g., rocks, ditches, branches, etc., such that the vertical distance the suspension system 200 may travel may be independent of any of the other suspension systems that may traverse different objects of varying heights. For example, the steering hub 205 may be affixed vehicle 102, and the remaining components of the suspension system 200 may vertically travel with respect to the vehicle 102. In some implementations, the suspension system 200 may have a height variation of 200 mm.

The torque arm 212, the main strut 220, and the rotary damping wheel hub 225 may operate together to maintain the suspension system 200 in a vertical orientation. Rotation of the in-wheel motor 230 and the smart tire 210 may drive the damping wheel hub 225 in a direction the smart tire 210 is facing. The main strut 220 may be pivotably coupled (e.g., via hinges) to each of the steering disk 214 and the rotary damping wheel hub 225. The torque arm 212 may interconnect the main strut 220 and the magnetic-controlled shock damper 215. The torque arm 212 may pull the main strut opposite the direction the smart tire 210 is facing to counteract the force imparted by the in-wheel motor 230 and the smart tire 210. The pivotable connection of the main strut 220 may allow the main strut 220 to adapt to changing height of the magnetic-controlled shock damper 215 and to adapt to changing forces.

Figure 4:
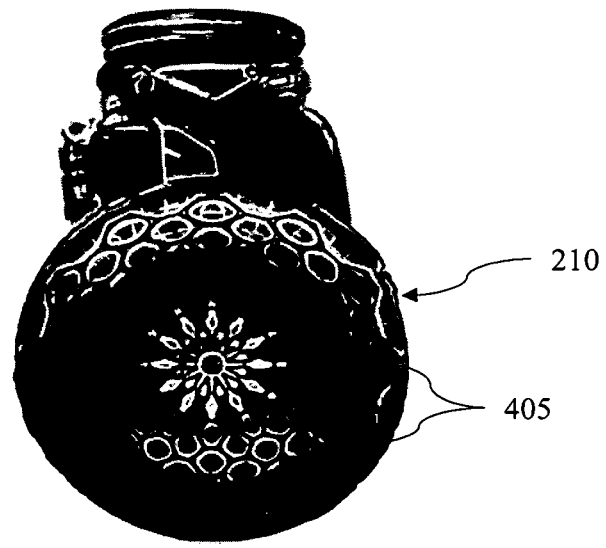
FIG. 4 illustrates a front view of the example suspension system in accordance with aspects of the present disclosure.

In some implementations, the vehicle system 110 may control a configuration of the smart tire 210. That is, in some implementations, the smart tire 210 may be configured to morph into different configurations based on, for example, road conditions, weather conditions, etc. To achieve the different configurations, as illustrated in FIG. 4, the smart tire 210 may include a plurality of scales 405 that form the smart tire 210 and may be reconfigured based on signals received from the vehicle system 110. For example, the vehicle system 110 may change the structure of the smart tire 210 and/or a density of the smart tire 210 to provide, for example, suspension control, and/or control of a ground pressure of the smart tire 210 based on the terrain and/or weather conditions.

In some implementations, changing the structure of the smart tire 210 may include changing a tread pattern and/or a sidewall pattern of the smart tire by modifying the arrangement of the plurality of scales 405. In some implementations, the arrangement of the plurality of scales 405 may be modified by, for example, raising and/or lowering the plurality of scales to adjust the tread pattern and/or sidewall pattern. In further implementations, the arrangement of the plurality of scales 405 may be modified by, for example, changing the density of the plurality of scales 405 to condense and/or expand the size of the plurality of scales 405. Modifying the arrangement of the plurality of scales 405 may be based on information obtained by the one or more exterior cameras 121, the Lidar laser scanner 122, the sensor 123, and/or the CAN reader 124. For example, the one or more exterior cameras 121, the Lidar laser scanner 122, the sensor 123, and/or the CAN reader 124 may detect slippery conditions, e.g., wet, muddy, or snowy conditions, and during such conditions, the vehicle system 110 may modify the tread pattern of the smart tire 210 by adjusting the plurality of scales 405 to provide for one or more grooves that allow the smart tire 210 to displace water between the ground and the smart tire 210. As another example, one or more exterior cameras 121, the Lidar laser scanner 122, the sensor 123, and/or the CAN reader 124 may detect dry conditions, and during such conditions, the vehicle system 110 may modify the tread pattern of the smart tire 210 by adjusting the plurality of scales 405 to reduce the number of grooves in the smart tire 210, thereby providing a greater surface area of the smart tire 210 in contact with the ground. As yet another example, one or more exterior cameras 121, the Lidar laser scanner 122, the sensor 123, and/or the CAN reader 124 may detect unpaved surfaces, e.g., loose dirt, mud, sand, or gravel, and the vehicle system 110 may adjust the tread pattern of the smart tire 210 by adjusting the plurality of scales 405 to reconfigure the smart tire 210 as an off-road tire, e.g., adjusting the plurality of scales 405 to have deeper and wider treads, to provide more traction on the unpaved surfaces. In some implementations, the driver of the vehicle 102 may manually select to adjust the tread pattern of smart tire 210.

Additionally, the vehicle system 110 may adjust the size of the sidewall and width of the smart tire 210 in order to adjust the aspect ratio of the smart tire 210. For example, the smart tire 210 may have an adaptive width, for example, a width of 265 mm plus or minus 50 mm. In some implementations, adjusting the size of the sidewall and width of the smart tire 210 may be achieved by, for example, adjusting the plurality of scales 405 by changing an orientation between two or more scales of the plurality of scales 405, such that the two or more scales are converted from being a part of the sidewall to being a part of the width of the tire (or vice-versa). For example, the width of the smart tire 210 may be increased (and the sidewall size decreased) by changing the orientation of two or more scales from being substantially perpendicular to the ground to being substantially parallel to the ground. For example, an interior angle between sidewall scales and tread scales may be decreased to make the tread scales more parallel to the ground. Conversely, the width of the smart tire 210 may be decreased (and the sidewall size increased) by changing the orientation of two or more scales from being substantially parallel to the ground to being substantially perpendicular to the ground.

In further implementations, changing the density of the smart tire may include changing density of the smart tire based on detected conditions. Namely, the vehicle system 110 may reconfigure the smart tire to be softer in order increase traction during slippery conditions, e.g., during rain and/or snow. On the other hand, in dry conditions, the vehicle system 110 may reconfigure the smart tire 210 to be harder in order to increase the longevity of the smart tire 210. To change the density of the smart tire 210, the vehicle system may apply an electrical current to the smart tire 210. For example, the density of the smart tire 210 may be increased by increasing the electrical current provided to the plurality of scales 405, whereas the density of the smart tire 210 may be reduced by decreasing the electrical current provided to the plurality of scales 405.

In further implementations, changing the ground pressure of the smart tire 210 may include changing the ground pressure based on terrain and/or weather conditions. For example, increasing the size of the contact area of the smart tire 210 on the ground in relation to the weight may decrease the ground pressure, which may allow for easier passage of the vehicle 102 over soft terrain, such as, mud or snow. Thus, the vehicle system 110 may reduce the ground pressure by increasing the surface area, e.g., by reducing the size of the sidewall and increasing the width of the smart tire 210, and/or reducing the weight applied to the smart tire 210. Additionally, the vehicle system 110 may increase the ground pressure of the smart tire 210 by decreasing the surface area, e.g., by increasing the size of the sidewall and decreasing the width of the smart tire 210, and/or increasing the weight applied to the smart tire 210. To achieve this, the vehicle system 110 may adjust, for example, the tire pressure of the smart tire 210 exposed to the soft terrain, thereby increasing the surface area of the smart tire 210. Alternatively, or additionally, the vehicle system 110 may adjust the weight distribution of the vehicle by, for example, decreasing the smart tire 210 exposed to the soft terrain and increasing the load of any remaining smart tire 210 of the vehicle 102.

FIG. 5 illustrates an exemplary network 500 for facilitating communications between multiple systems. For example, a network 500 may include the Internet or another Internet Protocol (IP) based network that may enable the vehicle 102 to communicate with the manufacturer system 510. For example, the manufacturer system 510 may provide information, such as weather related information and/or road related information, to the vehicle 102, such the vehicle system 110 may control the suspension system 200, as discussed herein.

Figure 6:
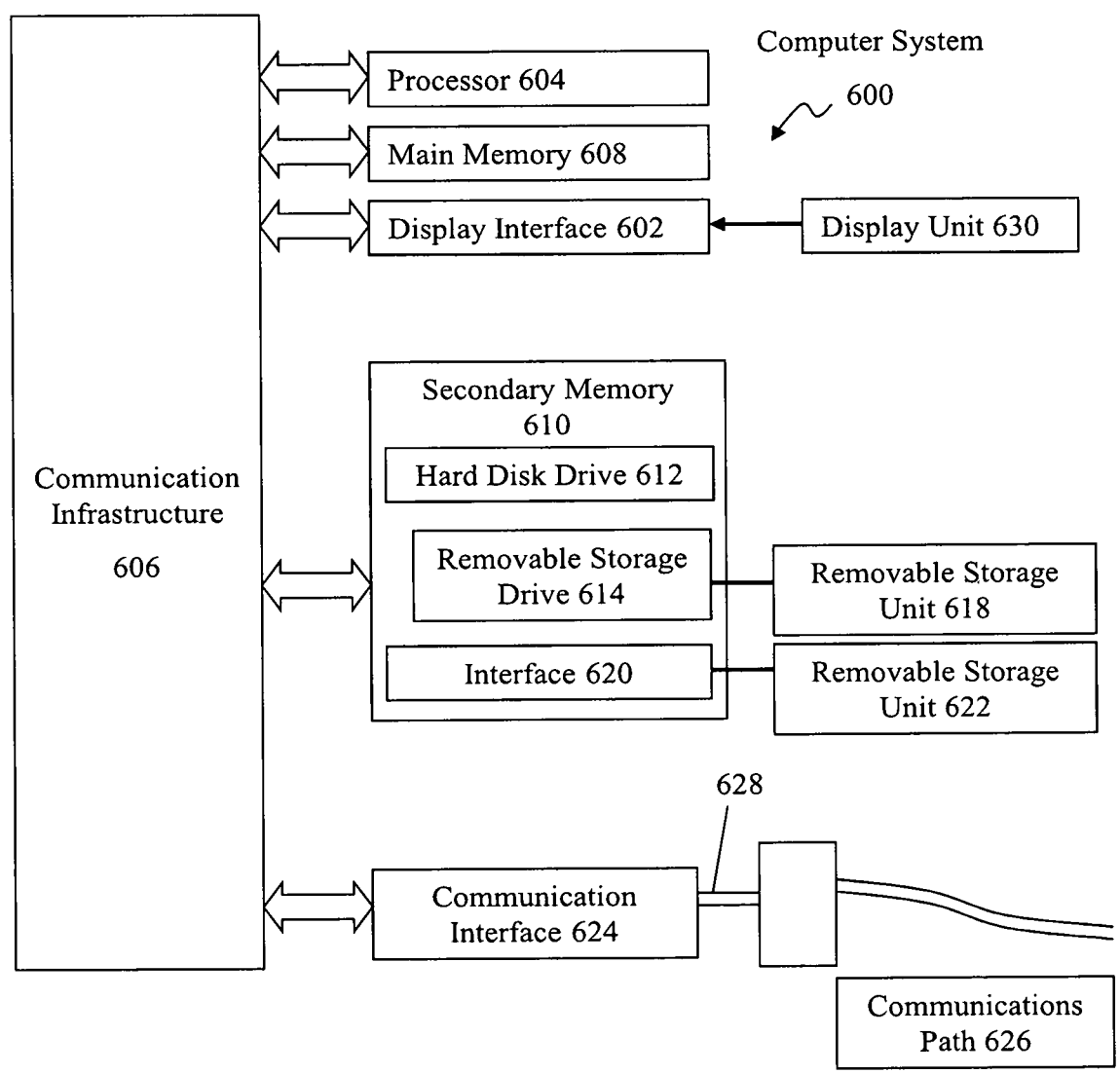
FIG. 6 illustrates various features of an example computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data.

Alternative aspects of the present disclosure may include secondary memory 610 and may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624.

Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage unit 618, a hard disk installed in hard disk drive 612, and signals 628. These computer program products provide software to the computer system 600. Aspects of the present disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features in accordance with aspects of the present disclosure, as discussed herein. In particular, the computer programs, when executed, enable the processor 604 to perform the features in accordance with aspects of the present disclosure. Accordingly, such computer programs represent controllers of the computer system 600.

In an aspect of the present disclosure where the disclosure is implemented using software, the software may be stored in a computer program product and loaded into computer system 600 using removable storage drive 614, hard drive 612, or communications interface 620. The control logic (software), when executed by the processor 604, causes the processor 604 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 7:
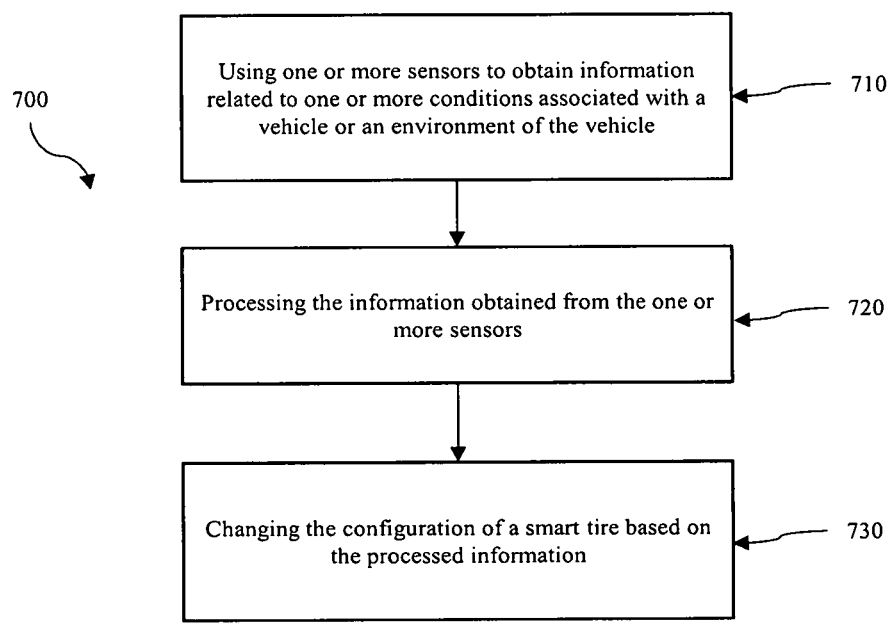
FIG. 7 illustrates a flowchart method for controlling a suspension system, according to aspects of the present disclosure.

FIG. 7 illustrates a flowchart for controlling a configuration of a smart tire. A method 700 may include using one or more sensors to obtain information related to one or more conditions associated with a vehicle or an environment of the vehicle 710. In some implementations, the one or more sensors may include one or more exterior cameras, a Lidar laser scanner, a sensor, and a vehicle controller area network (CAN) reader. The method 700 may also include processing the information obtained from the one or more sensors 720 and changing the configuration of a smart tire based on the processed information 730. For example, changing the configuration of the smart tire may include changing the structure of the smart tire, a density of the smart tire, and/or a ground pressure of the smart tire based on the terrain and/or weather conditions, as discussed herein.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A suspension system comprising:
a smart tire mounted on a wheel and configured to morph into different configurations, wherein the smart tire comprises a plurality of reconfigurable scales configured to be modified to change a structure of the smart tire, a density of the smart tire, or a ground pressure of the smart tire;
an electromagnetic steering hub configured to rotate the wheel 360 degrees about a vertical axis; and
an in-wheel motor configured to drive the wheel about a horizontal axis.

2. The suspension system of claim 1, wherein the reconfigurable scales are configured to be modified to change a tread pattern or a sidewall pattern of the smart tire.

3. The suspension system of claim 2, wherein at least a portion of the reconfigurable scales are further configured to be raised or lowered for changing the tread pattern or the sidewall pattern.

4. The suspension system of claim 2, wherein at least a portion of the reconfigurable scales are further configured to be modified to increase or decrease a number of grooves in the smart tire.

5. The suspension system of claim 2, wherein at least a portion of the reconfigurable scales are further configured to be modified to increase depths or widths of one or more treads of the smart tire.

6. The suspension system of claim 1, wherein at least a portion of the reconfigurable scales are configured to be modified to adjust an aspect ratio of the smart tire.

7. The suspension system of claim 1, wherein at least a portion of the reconfigurable scales are configured to be condensed or expanded for changing the density of the smart tire.

8. The suspension system of claim 7, wherein changing the density of the smart tire comprises changing an electrical current provided to the smart tire.

9. The suspension system of claim 1, wherein the suspension system further comprises:
a steering disk configured to rotate the wheel;
a torque arm configured to control a range of motion of the smart tire;
a magnetic-controlled shock damper configured to control an elevation change of the smart tire;
a main strut for controlling compression of the suspension system; and
a rotary damping wheel hub for damping a rotation of the smart tire.

10. The suspension system of claim 9, wherein the main strut is pivotably coupled to the torque arm and the rotary damping wheel hub.

11. The suspension system of claim 9, wherein the magnetic-controlled shock damper is configured to control the elevation change.

12. A vehicle comprising:
one or more sensors configured to obtain information related to one or more conditions associated with the vehicle or an environment of the vehicle;
a plurality of smart tires having a plurality of reconfigurable scales; and
a vehicle system having a processor and configured to receive the information from the one or more sensors and control the plurality of smart tires, wherein the vehicle system is configured to modify a structure of the smart tire, a density of the smart tire, or a ground pressure of the smart tire.

13. The vehicle of claim 12, wherein the vehicle system is configured to modify a tread pattern or a sidewall pattern of the smart tire.

14. The vehicle of claim 13, wherein the vehicle system is configured to raise or lower at least a portion of the reconfigurable scales to modify the tread pattern or the sidewall pattern.

15. The vehicle of claim 13, wherein the vehicle system is configured to modify at least a portion of the reconfigurable scales to increase or decrease a number of grooves in the smart tire.

16. The vehicle of claim 13, wherein the vehicle system is configured to modify at least a portion of the reconfigurable scales to increase depths or widths of one or more treads of the smart tire.

17. The vehicle of claim 12, wherein the vehicle system is configured to modify at least a portion of the reconfigurable scales to adjust an aspect ratio of the smart tire.

18. The vehicle of claim 12, wherein the vehicle system is configured to condense or expand at least a portion of the reconfigurable scales to modify the density of the smart tire.

19. The vehicle of claim 18, wherein the vehicle system is further configured to change an electrical current provided to the smart tire to change the density of the smart tire.

20. The vehicle of claim 12, further comprising:
    a plurality of suspension systems each having;
        an electromagnetic steering hub configured to rotate a wheel 360 degrees about a vertical axis; and
        an in-wheel motor configured to drive the wheel about a horizontal axis; and
    wherein the plurality of smart tires are each mounted on a corresponding wheel of the plurality of suspension system.

21. The vehicle of claim 20, wherein each of the plurality of suspension systems further comprises:
    a steering disk configured to rotate the wheel;
    a torque arm configured to control a range of motion of the smart tire;
    a magnetic-controlled shock damper configured to control an elevation change of the smart tire;
    a main strut for controlling compression of the suspension system; and
    a rotary damping wheel hub for damping a rotation of the smart tire.

22. The vehicle of claim 21, wherein the vehicle system is configured to transmit a control signal to the magnetic-controlled shock damper to control a stiffness of the magnetic-controlled shock damper.

* * * * *